Aug. 15, 1967    E. PULFER    3,335,702
ADJUSTABLE DOCTOR BLADE
Filed Aug. 25, 1965    2 Sheets-Sheet 1

United States Patent Office 3,335,702
Patented Aug. 15, 1967

3,335,702
ADJUSTABLE DOCTOR BLADE
Erwin Pulfer, Zollikofen, Switzerland, assignor to Maschinenfabrik Winkler, Fallert & Co. AG., Bern, Switzerland
Filed Aug. 25, 1965, Ser. No. 482,528
Claims priority, application Sweden, Sept. 8, 1964, 10,744/64
4 Claims. (Cl. 118—261)

ABSTRACT OF THE DISCLOSURE

A scraper mounting mechanism for use in printing and similar fields is disclosed. In accordance with the invention, a scraper is mounted so that it may be shifted by a precise amount automatically by pressure cylinder controls. The apparatus includes means for indicating the proper orientation of a scraper in respect to a roller or similar element with which it is to be employed. The inventive construction includes the mounting of a scraper in a bushing which may be rotated under the control of a pneumatic cylinder in order to bring the entire scraper system into and out of position in respect to orientation with a cylinder such as an inking cylinder of a printing machine. A second fluid pressure cylinder control element is provided for precisely connecting and disconnecting the scraper in an operative position. A presettable dial indicator is provided for accurately controlling the end position of the scraper element when moved by the fluid pressure shifting elements which are regulated by the setting on the dial.

The scraper is rotatably supported on a scraper shaft on an arm member. The scraper may be rotated about its mounting arm for setting the position of the scraper angle. The adjustable setting means associated with a reading dial are connected to the scraper shaft for movement therewith and it is connected to the means for rotating the scraper shaft and to the means for rotating the scraper about its mounting on its arm in order to stop movement of the scraper and the arm and rotation of the scraper about the arm in accordance with the adjustment on the adjustable setting means.

Summary of the invention

This invention relates, in general, to the construction of scraper devices or doctor blades for use with applicator or pick-up rollers and, in particular, to a new and useful scraper device having means for preselecting and accurately positioning the scraper and the angle of the scraper for orienting the same in respect to a cylinder or other apparatus with which it is to be employed.

The present invention has particular application in respect to the printing and similar fields where a scraper or adapter blade element is adapted to be oriented in respect to a cylinder for operating thereon to remove a coating adhesive, ink or other liquid from the surface thereof and control quantities.

The present invention is an improvement over prior art devices particularly in respect to the means for mounting the scraper so that it may be shifted by a precise amount automatically such as through pressure cylinder controls and which further includes means for indicating the proper orientation of the scraper in respect to a roller or similar element with which it is to be employed. In accordance with a preferred arrangement of the invention, there is provided means for mounting the scraper in a bushing which may be rotated under the control of a pneumatic pressure cylinder in order to bring the entire scraper system into and out of position in respect to orientation with a cylinder such as an inking cylinder for example. The apparatus of the invention further includes a second fluid pressure cylinder control element for precisely connecting and disconnecting the scraper in an operative position.

Accordingly, it is the object of the invention to provide a scraper device having setting means for setting and offsetting the scraper clearance angle as well as for setting the plate cylinder circumference.

A further object of the invention is to provide a scraper device which includes a scraper shaft and bushing member which rotatably carries the scraper element on an arm rotatable therewith, with means for shifting the bushing with the scraper for orienting the scraper in respect to its associated cylinder and with further means for accurately positioning the scraper angle and including adjustment dial means associated with the scraper for accurately positioning the scraper automatically.

A further object of the invention is to provide a scraper mounting construction which includes pre-settable dial means for accurately controlling the end position of a scraper element automatically through fluid pressure shifting elements which are regulated by the setting on the dial means.

A further object of the invention is to provide a scraper which is simple in design, rugged in construction and economical to manufacture.

The various features of novelty which characterize the invention are pointed out with particularity in the claims annexed to and forming part of this specification. For a better understanding of the invention, its operating advantages and specific objects attained by its use, reference should be had to the accompanying drawings and descriptive matter in which there is illustrated and described a preferred embodiment of the invention.

Figure 1:
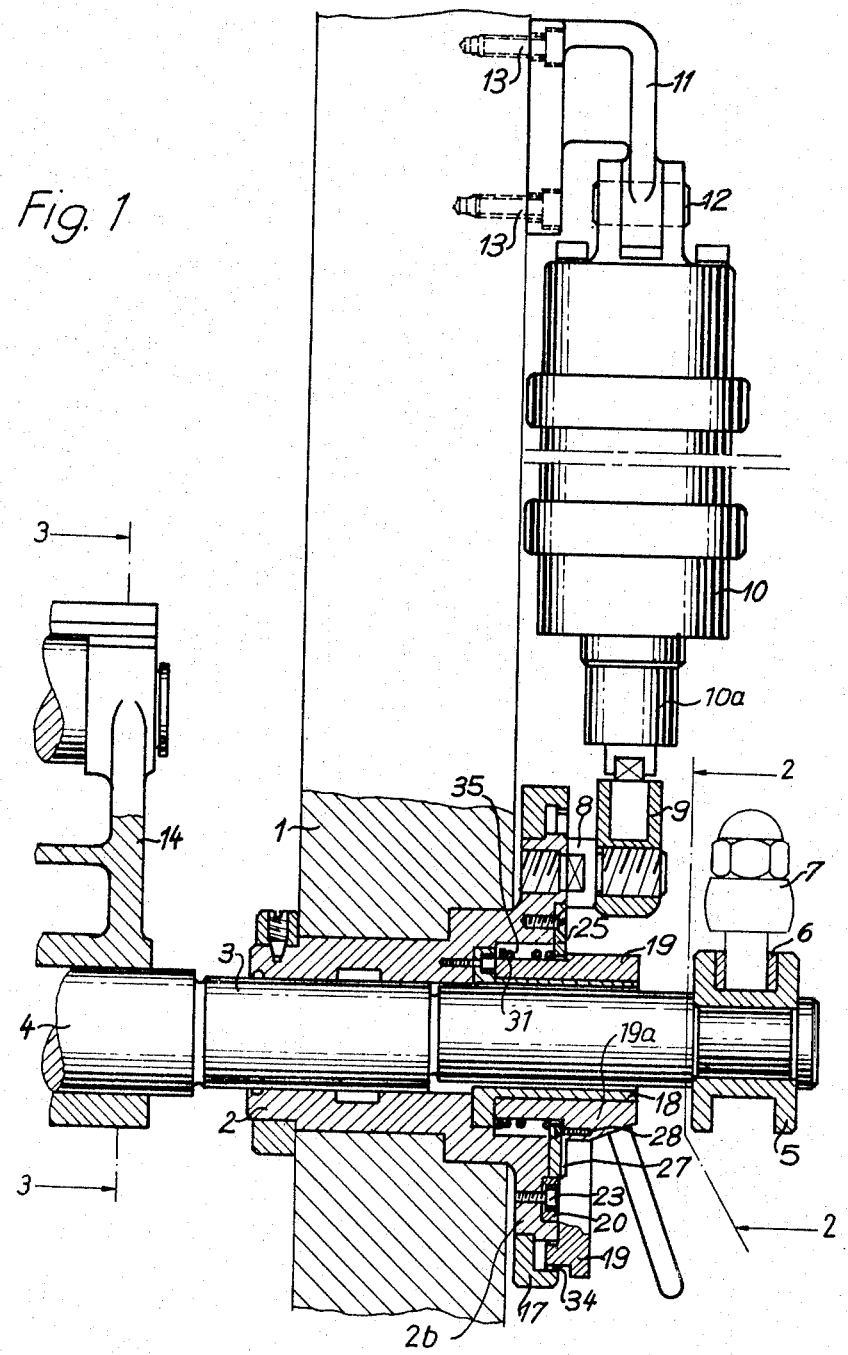
FIG. 1 is a partial elevation and partial sectional view showing a scraper mounting mechanism and constructed in accordance with the invention.

Referring to the drawings in particular, the invention embodied therein comprises a scraper mounting assembly which is mounted in a supporting wall 1 in a bushing 2 which is rotatable in the wall. A scraper shaft 4 is axially displaceably held in the bushing 2 and includes a squared or polygonal section 3 which insures that rotation of the bushing 2 will also impart rotation to the shaft 4. The shaft 4 may be shifted axially by a lever member 7 which is carried on a guide 5 in a cheek portion 6.

In accordance with the invention, the bushing 2 provides means for pivoting the entire scraper assembly into and out of an operative position. For this initial adjustment there is provided a crank or bolt member 8 which is connected through a joint head 9 with fluid control means including a piston rod portion 10a which is slidable in a fluid pressure cylinder 10, the movement of which, in the embodiment illustrated, is controlled by air pressure through a supply line (not shown). The piston (not shown) within the cylinder 10 is reciprocated to shift the piston rod portion 10a and the head 9 for the purpose of rotating the bushing 2 with the shaft 4 and a scraper arm 14 which is carried on the shaft. The pneumatic cylinder 10 is fastened to the side wall 1 by means of a pivotal support structure 11 which permits swinging movement of the piston 10 about the pivot 12. Bolt elements or screws 13 are provided to hold the support element 11 in position on the wall 1 as indicated in FIG. 1.

After the initial operation position of the scraper is determined by shifting rod 10a in the cylinder by actuation of the fluid cylinder 10 there is provided a second fluid cylinder control means 15 having one end pivotally mounted at 15a to a fixed support and having a piston rod portion 15b which is movable under the control of fluid, for example air pressure, which is directed to the cylinder 15 through lines (not shown). The piston rod portion 15b is pivotally connected at 15c to a scraper mounting mechanism generally designated 50 and the cylinder 15 is carried at the end of the arm 14. The scraper 16 is mounted on the plates 52 and 54 which are bolted to a rotatable roller 58 which is rotatably mounted at the end of the arm 14. A plate member 60 is secured to the roller by a bolt 62 and it is pivotally connected at its outer end at the pivot point 15c with the rod 15b. The plate member includes a set screw 64 which permits the shifting of the plates 52 and 54 and the scraper 16 for adjustment purposes. After adjustment the plates are clamped in position by clamping bolts 66. Actuation of the fluid control cylinder 15 is accomplished in order to accurately position the blade 16 at an angle in respect to an associated cylinder (not shown) with which it will be operated.

The bushing 2 includes a widened portion or hub element 2b to which is secured a toothed rim 17 having internal teeth 34 which mesh with external teeth on an abutment sector member 19. The sector 19 is rotatable on a collar member 18 which is firmly connected with the bushing 2 in a recess of the hub element 2b. The bushing 2 carries a displaceably arranged scale 20 having marks thereon for example which indicates positioning locations for the device in respect to plate cylinders having circumferences of varying diameter, for example varying from 710 to 1250 mm. The scale also includes an arrow or indicator 56 for orientation with fixed angle indications or scale 26, extending, for example, from 50° to 70°. The setting of the scale 20 is affected by displacement of the scale which may be accomplished by loosening bolts 23 and 24 and sliding the scale appropriately. The scale 20 is provided with slots 21 and 22 for this purpose. The scale 26 of the clearance angles are indicated on a conveyor plate element 25 which is secured to the bushing 26. The abutment sector 19 carries an arrow 27 which is secured by means of screws 28. The arrow 27 aligns with the scale 20 and indicates the plate cylinder circumference with which the scraper is to be employed as a means for setting the device in this manner.

Secured to the wall 1 is a position control means comprising an abutment or stop element 30 which is held on the wall by means of bolts 31. The abutment sector 19 has an outwardly extending portion defining an abutment face 29 which is adapted to contact the abutment 30 at the end of the path of movement of the scrape as controlled by the set position. When the abutment sector 19 is set in position at the correct indicated scale the abutment 30 will limit the travel movement of the segment and hence of the collar 2 and the scraper shaft 4.

Figure 2:
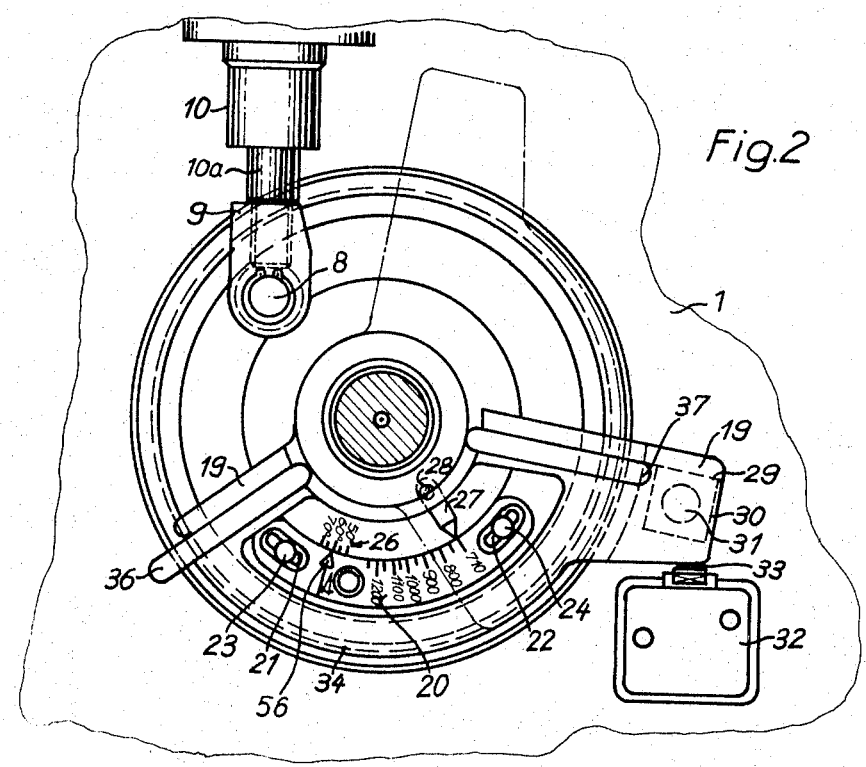
FIG. 2 is a partial sectional and elevational view taken on the line 2—2 of FIG. 1.
Figure 3:
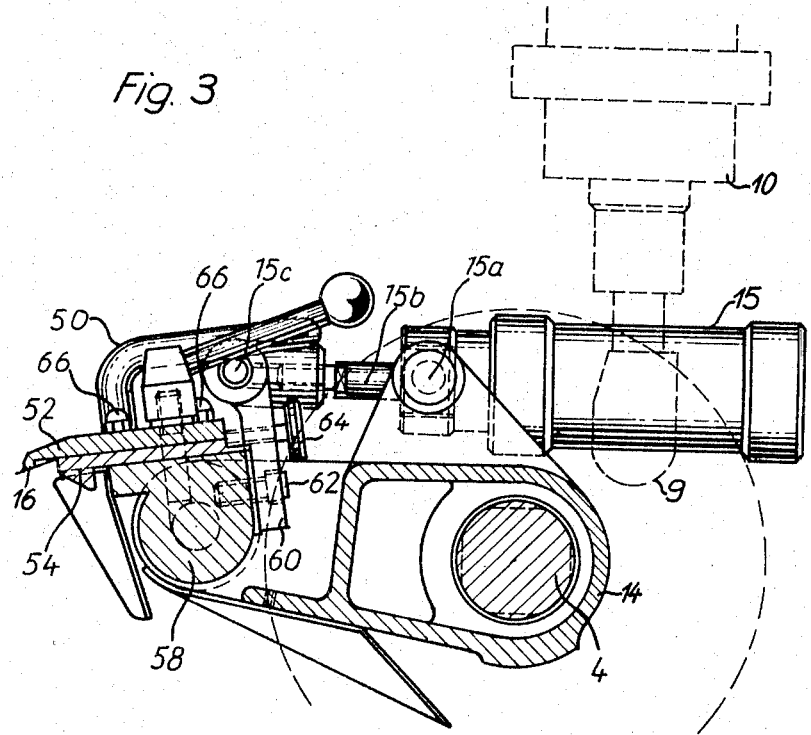
FIG. 3 is a section taken on the line 3—3 of FIG. 1.

Also fastened to the side wall 1 are scraper angle position control means comprising a ventilating valve or control valve 32 for operating the control cylinders 10 and 15 through control connections (not shown), and advantageously provides a lock for setting valve (not shown) for the cylinders 10 and 15. The control valve element 32 is actuated through a contact 33 by engagement of the opposite end face of the abutment sector 19. In the contact position indicated in FIG. 2, the cylinders 10 and 15 will be stopped.

The device is operated by pulling the hub portion 19a of the abutment segment 19 axially outwardly by compressing a spring 35 disposed between a washer 37 carried on the hub portion and the plate 25. For this purpose handle elements or levers 36 and 37 are provided. When the handles 36 and 37 are engaged the abutment segment 19 may be disengaged from the teeth 34 and rotated in order to set the scales in accordance with the following:

(1) The scale 20 is set to the desired scraper clearance angle.

(2) The desired plate cylinder circumference is indicated by the arrow 27 in accordance with the positioning of the abutment sector 19.

After the setting takes place the abutment sector 19 is allowed to fall back into position by the urging of the spring 35 and the setting is complete.

After the setting has been completed the pneumatic cylinder 10 is actuated to cause the scraper piston to be pivoted by an amount to cause the abutment 29 on the sector 19 to move up to the abutment 30 on the wall 1. At this time, the actuation of the switch element 33 will cause the control 32 to discontinue the operation of the cylinder 10. The control also actuated the pneumatic cylinder 15 and the scraper 16 is applied against the plate cylinder with a pre-selected scraper clearance angle which has been indicated on the scale 26.

When the cylinder 15 is actuated, the rod portion 15b is moved outwardly to rock the scraper 16 about the center of rotation of a shaft 58. The rocking will be in a direction in accordance with the setting of the dial 26 and will be governed by the control element 32, the actuation of which will be varied in accordance with the setting of the scale member 20 with the sector 19 in relation to the indication on the plate 25. The abutment 30 will stop the movement of the sector 19 when the contact element portion thereon 29 is moved into engagement therewith.

While a specific embodiment of the invention has been shown and described in detail to illustrate the application of the inventive principles, it will be understood that the invention may be embodied otherwise without departing from such principles.

What is claimed is:

1. A scraper device for use in association with a cylinder and the like comprising, a rotatable scraper shaft, a bushing surrounding a portion of said shaft and rotatable therewith, a scraper supporting arm affixed to said scraper shaft and extending outwardly therefrom, a scraper rotatably supported on said scraper supporting arm, means connected to said scraper for rotating said scraper about its mounting on said arm, means connected to said scraper shaft to rotate said scraper shaft with said arm for setting the scraper arm and scraper with respect to an operating cylinder, first indicating means carried by said bushing including an adjustable sector having gear teeth and being rotatably mounted on said bushing, gear means defined in the interior of said bushing for engagement with said gear teeth on said sector, means to bias said sector gear teeth into engagement with said gear means for locking said sector in an adjusted position, said sector being movable outwardly against said biasing for disengagement of said sector teeth from said gear means for locating said sector, indicating means carried on said sector for orientation in respect to fixed indicating means carried by said bushing for indicating scraper angle and setting position, and control means disposed in the path of movement of said sector and contactable upon predetermined rotation thereof with said bushing for stopping rotation of said scraper shaft and rotation of said scraper about its mounting on said arm.

2. A scraper device for use in association with a cylinder and the like comprising, a rotatable scraper shaft, a bushing surrounding a portion of said shaft and rotatable therewith, a scraper supporting arm affixed to said scraper shaft and extending outwardly therefrom, a scraper rotatably supported on said scraper supporting arm, means connected to said scraper for rotating said scraper about its mounting on said arm, means connected to said scraper shaft to rotate said scraper shaft with said arm for setting the scraper arm and scraper with respect to an operating cylinder, first indicating means carried by said bushing including an adjustable sector having gear teeth and being rotatably mounted on said bushing, gear means defined on said bushing for engagement with said gear teeth on said sector, said sector being movable outwardly for disengagement of said sector teeth from said gear means for locating said sector, indicating means carried on said sector for orientation in respect to fixed indicating means carried by said bushing for indicating scraper angle and setting position, said sector having an abutment defined thereon, a fixed stop disposed in the path of movement of said sector and contactable with said abutment for stopping movement of said sector and rotation of said scraper shaft, and control means disposed in the movement of said sector and contactable upon predetermined rotation thereof with said bushing for stopping rotation of said scraper about its mounting on said arm.

3. A scraper device for use in association with a cylinder and the like comprising, a rotatable scraper shaft, a bushing surrounding a portion of said shaft and rotatable therewith and having an end flange with a recess therein, a scraper supporting arm affixed to said scraper shaft and extending outwardly therefrom, a scraper rotatably supported on said scraper supporting arm means connected to said scraper for rotating said scraper about its mounting on said arm including a fluid cylinder and a rod actuable by said cylinder connected to said scraper for rotating said scraper about its mounting on said arm, means connected to said scraper shaft to rotate said scraper shaft with said arm for setting the scraper arm and scraper with respect to an operating cylinder including a second fluid pressure cylinder and a connecting rod operated by said cylinder connected to said bushing at a spaced location from the center of rotation thereof, first indicating means carried by said bushing including an adjustable sector having gear teeth and being rotatably mounted in said bushing recess, gear means defined in the interior of said bushing for engagement with gear means on said sector means to bias said sector teeth into engagement with said gear means for locking said sector in an adjusted position, said sector being movable outwardly against said biasing for disengagement of said sector teeth from said gear means for locating said sector, indicating means carried on said sector for orientation in respect to fixed indicating means carried by said bushing for indicating scraper angle and setting position, said sector having an abutment defined thereon, a fixed stop disposed in the path of movement of said sector and contactable with said abutment for stopping movement of said sector and rotation of said scraper shaft, and control means disposed in the movement of said sector and contactable upon predetermined rotation thereof with said bushing for stopping rotation of said scraper about its mounting on said arm.

4. A scraper device for use in association with a cylinder and the like comprising, a rotatable scraper shaft, a bushing surrounding a portion of said shaft and rotatable therewith and having an end flange with a recess therein, a scraper supporting arm affixed to said scraper shaft and extending outwardly therefrom, a scraper rotatably supported on said scraper supporting arm means connected to said scraper for rotating said scraper about its mounting on said arm including a fluid cylinder and a rod actuable by said cylinder connected to said scraper for rotating said scraper about its mounting on said arm, means connected to said scraper shaft to rotate said scraper shaft with said arm for setting the scraper arm and scraper with respect to an operating cylinder including a second fluid pressure cylinder and a connecting rod operated by said cylinder connected to said bushing at a spaced location from the center of rotation thereof, first indicating means carried by said bushing including an adjustable sector rotatably mounted in said bushing recess gear means defined in the interior of said bushing for engagement with gear means on said sector means to bias said sector teeth into engagement with said gear means for locking said sector in an adjusted position, said sector being movable outwardly against said biasing for disengagement of said sector teeth from said gear means for locating said sector, indicating means carried on said sector including a displaceable scale mounted for orientation in respect to fixed indicating means carried by said bushing for indicating scraper angle and setting position, said sector having an abutment defined thereon, a fixed stop disposed in the path of movement of said sector and contactable with said abutment for stopping movement of said sector and rotation of said scraper shaft, and control means disposed in the movement of said sector and contactable upon predetermined rotation thereof with said bushing for stopping rotation of said scraper about its mounting on said arm.

References Cited

UNITED STATES PATENTS 3,006,275 10/1961 Allen.
3,128,207 4/1964 Schmitt _____ 118—126

CHARLES A. WILLMUTH, *Primary Examiner.*

R. I. SMITH, *Assistant Examiner.*